United States Patent [19]

Stanton

[11] Patent Number: 4,541,357
[45] Date of Patent: Sep. 17, 1985

[54] WATERCRAFT HAVING WATER JET LIFT

[76] Inventor: Austin N. Stanton, 3017 Stonehenge La., Carrollton, Tex. 75006

[21] Appl. No.: 540,861

[22] Filed: Oct. 11, 1983

[51] Int. Cl.[4] .................. B63H 11/04; B64C 29/00
[52] U.S. Cl. .......................... 114/67 R; 244/23 R; 440/38
[58] Field of Search ............ 114/67 R; 440/38, 39; 244/12.2, 23 R; 46/95; 239/191, 192

[56] References Cited

U.S. PATENT DOCUMENTS

| | | | |
|---|---|---|---|
| 243,656 | 6/1881 | Stucky | 114/289 |
| 646,391 | 3/1900 | Simmons | 440/38 |
| 1,007,811 | 11/1911 | Somers | 440/38 |
| 1,543,026 | 6/1925 | Paxton | 440/38 |
| 1,702,222 | 2/1929 | Paxton | 440/38 |
| 1,716,400 | 6/1929 | Weis | 440/38 |
| 1,758,847 | 5/1930 | McIntosh | 440/38 |
| 2,699,644 | 1/1955 | Coanda | 114/67 R |
| 2,764,954 | 10/1956 | Oeltgen | 114/67 A |
| 3,561,156 | 2/1971 | Tobias et al. | 440/40 |
| 3,675,611 | 7/1972 | Glass | 440/40 |
| 3,700,172 | 10/1972 | Gallegos | 244/12.2 |
| 3,835,806 | 9/1974 | Rice | 440/40 |
| 3,968,762 | 7/1976 | Meyer | 440/38 |
| 4,265,192 | 5/1981 | Dunn | 440/40 |

Primary Examiner—Trygve M. Blix
Assistant Examiner—Edwin L. Swinehart
Attorney, Agent, or Firm—Richards, Harris, Medlock & Andrews

[57] ABSTRACT

A watercraft (10) operates as a conventional displacement vessel or as an airborne craft. In the airborne mode water is drawn upward through a drogue (18) by operation of a pump (42) which is driven by a motor (44). Pressurized water from the pump (42) is directed downward as water jets by nozzles (64–70). The reaction force on the nozzles (64–70) serves to lift the watercraft (10) above the surface of a body of water (16). The watercraft (10) is further equipped with fore and aft nozzles (84, 90) as well as transverse nozzles (86, 88) to provide full directional control and propulsion for the watercraft (10). A control computer (100) operates through a bus (102) to position the drogue (18) as well as control the thrust produced by the nozzles (64–70) and (84–90). The altitude of the watercraft (10) is measured by altimeters (94, 96). The height of forereached waves is measured by a wave height radar (92). The watercraft (10) can operate essentially free of friction with the water (16), can pass over obstacles such as rocks, and can land inland beyond the edge of the water (16).

24 Claims, 4 Drawing Figures

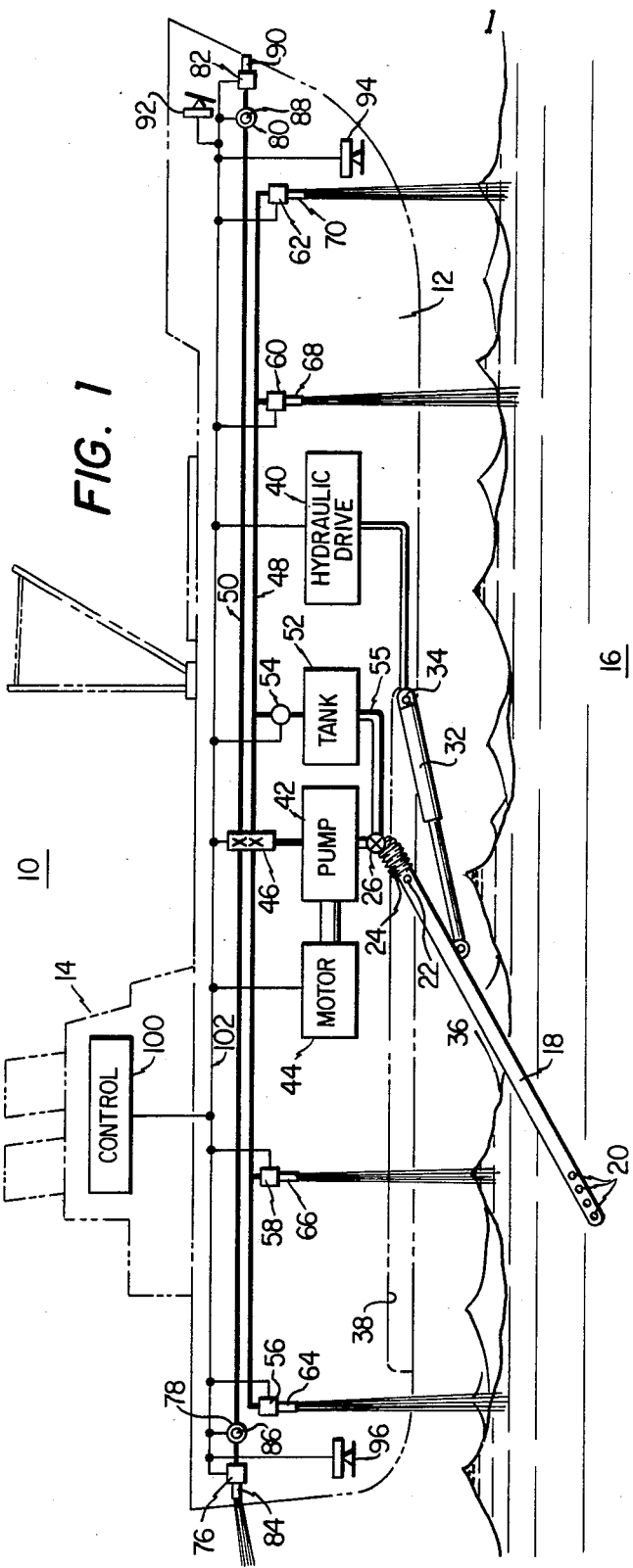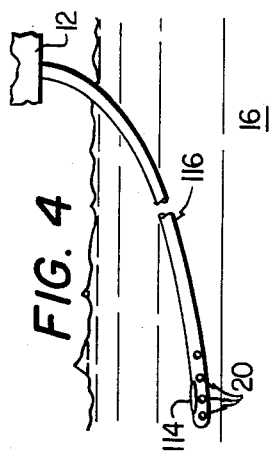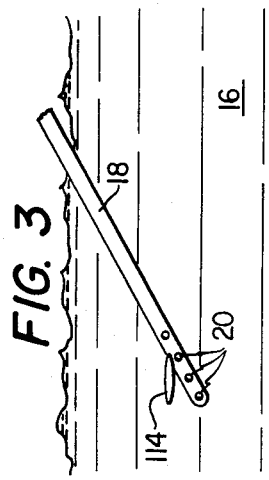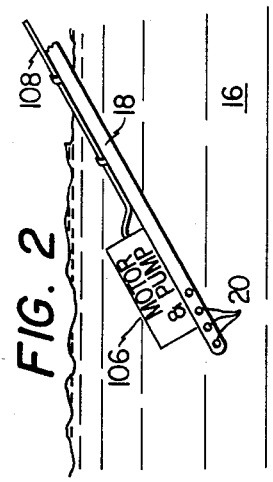

WATERCRAFT HAVING WATER JET LIFT

TECHNICAL FIELD

The present invention pertains in general to the propulsion of watercraft and in particular to the use of water jet streams for lifting, maneuvering and propelling a watercraft.

BACKGROUND OF THE INVENTION

The traditional means for inexpensive transportation of goods has been by water. The displacement of water permits a watercraft to carry a substantial weight of cargo and the extensive ocean area of the world permits access to many land areas. However, the speed of a watercraft is severely limited by friction between the hull of the craft and the water. As speed through the water increases the friction becomes even greater. There are also many limitations of the coastal areas that can be used for transferring cargo. Most oceangoing ships can be docked only at well-developed ports. The majority of the coastal areas are too rocky, shallow or otherwise inaccessible for use as cargo landing sites. However, there are numerous requirements for cargo transportation, both military and commercial, which could benefit by reduced water friction and access to the presently unused coastal areas.

Several technologies have been developed in attempts to overcome the above-described problems. Hydrofoil craft has been designed in which the hull of the craft rides above the water with wing-type foils in the water supplying support. This type of vessel can reduce friction with the water, however, it does not address the landing problem. Air cushion vehicles ride on a fan-produced air pocket held within a skirt or air curtain. This type of vehicle substantially reduces water friction but it has difficulty with rough water or uneven terrain, such as rocks found on many beaches. Both hydrofoils and air cushion vehicles are difficult to maneuver in tight areas. Traditional military landing craft have a shallow draft and are designed to be beached on the shore. But these craft typically are not stable in rough water and cannot make a landing when the terrain is rocky, steep or uneven. Even on gentle sandy beaches, the unloading of landing craft must proceed in draft depth water.

In view of the above problems there exists a need for a watercraft which can operate with reduced friction between the hull and water, can remain stable in turbulent water conditions, can overcome rocky and precipitous beach terrain and can be precisely maneuvered in tight quarters.

SUMMARY OF THE INVENTION

A preferred embodiment of the present invention comprises a watercraft which includes a hull which has a power source that is mounted on the hull to drive a water pump. A drogue has one end mounted to the hull and a free end which can extend below the hull into a body of water. Water is transferred from the body of water through the drogue by the action of the water pump. A plurality of nozzles are mounted to the hull and connected to receive pressurized water from the pump. The nozzles produce downwardly directed water jets which in turn produce reaction forces to lift the hull of the watercraft above the body of the water.

In a further aspect of the present invention, the pressurized water from the pump is directed to horizontally mounted nozzles to provide longitudinal, yaw and transverse motion to the watercraft.

BRIEF DESCRIPTION OF THE DRAWINGS

For a more complete understanding of the present invention and the advantages thereof, reference is now made to the following Description taken in conjunction with the accompanying Drawings in which:

FIG. 1 is an elevation view of a watercraft in accordance with the present invention wherein water is drawn upward through a drogue, pressurized and applied to downwardly directed nozzles to produce a reaction force to lift the watercraft above the body of water;

FIG. 2 is an elevation view of an alternate drogue for that shown in FIG. 1, the alternate drogue having a motor-pump mounted thereon to drive water upward through the drogue;

FIG. 3 is an alternate embodiment of the drogue shown in FIG. 1 wherein the alternate embodiment includes a vane at the lower end of the drogue to hold the drogue within the body of water, and FIG. 4 is a further alternate embodiment of the drogue shown in FIG. 1 wherein the alternate drogue embodiment comprises a flexible tubular member which extends away from the hull of the watercraft and can supply water from a source offset a short distance away from the watercraft.

DETAILED DESCRIPTION

Referring now to FIG. 1 there is shown a watercraft 10 in accordance with the present invention. The illustrated watercraft 10 is a small freighter or lighter, however, this is presented only as an example since the present invention is equally applicable to a vehicle as small as a radio controlled toy or as large as an oceangoing freighter.

The watercraft 10 includes a hull 12 and a superstructure 14. The watercraft 10 is shown operating above a body of water 16.

The watercraft 10 includes apparatus for lifting the hull above the surface of the water 16 so that friction with the water is substantially eliminated. This operation is accomplished by directing pressurized water jets downward from the hull so that the reaction force from the water drives the hull 12 upward out of contact with the water 16. The water which is utilized to produce the downward directed water jets is drawn from the body of the water 16. This supply of water is drawn in through a drogue 18 which is provided with inlet ports 20 located at the lower end of the drogue 18. The upper end of the drogue 18 is connected by means of a pivot 22 to the hull 12. The drogue 18 is an essentially rigid tubular member. The upper end of the drogue 18 is connected through a flexible coupling 24 to a multifunction valve 26.

The drogue 18 is positioned by operation of a linear hydraulic actuator 32. The actuator 32 is mounted to the hull 12 by means of a pivot 34 and to the drogue 18 by means of a pivot 36. The drogue 18 is illustrated in FIG. 1 in the operational position, however, when the actuator 32 is extended full length the drogue 18 is pivoted upward until it is received in a recess 38 in the bottom of the hull 12. When the drogue 18 is positioned within the recess 38, it is in the stowed position and the watercraft 10 operates in the conventional manner as a displacement vessel.

The hydraulic actuator 32 is positioned by operation of a hydraulic drive 40.

Water is drawn upward through the drogue 18 by operation of a pump 42 which has the inlet thereof connected to the multi-function valve 26. The pump 42 is driven by a motor 44 which can be, for example, a gas turbine or diesel. A multi-function valve 46 is connected to the outlet of the pump 42. A first output from the valve 46 supplies pressurized water from the pump 42 to a first water distribution system 48. A second outlet from the valve 46 supplies pressurized water to a second water distribution system 50.

A water tank 52 receives water from water distribution system 48 via a valve 54. Water tank 52 is connected to the multi-function valve 26 by a line 55.

The water distribution system 48 is connected to valves 56, 58, 60 and 62 which are in turn connected to downward facing nozzles 64, 66, 68 and 70 respectively. The nozzles 64-70 comprise a starboard nozzle set. There is a corresponding, but not illustrated, port set of nozzles connected to distribution system 48.

The water distribution system 50 is connected to valves 76, 78, 80 and 82 which are in turn respectively connected to horizontally directed nozzles 84, 86, 88 and 90. The nozzles 86 and 88 are directed to the starboard side. There is a corresponding, but not illustrated, set of port nozzles connected to system 50. Each of the described nozzles, including the bow and stern nozzles, can be operated independently.

A wave height measuring radar 92 is mounted on the hull 12 to determine the height of forereached waves. Fore and aft altimeters 94 and 96 determine the height of the corresponding sections of the hull 12 above the local surface of the body of water 16. The altimeters 94 and 96 are mounted on the starboard side of the hull 12. There is a corresponding, but not illustrated, set of port altimeters. The altimeters 94 and 96 can be, for example, acoustic rangefinders.

A control computer 100 serves to direct the operation of the lift and propulsion system of the watercraft 10 at the direction of the watercraft operator. The control computer 100 works through a control bus 102 to control the operation of the multi-function valve 26, hydraulic drive 40, pump 42, motor 44, multi-function valve 46, valves 56-62, and valves 76-82 as well as the corresponding port valves. The control computer 100 receives information control signals from the wave height radar 92 and the atlimeters 94 and 96 via bus 102. The various valves can be electrically or hydraulically operated.

The operation of the watercraft 10 in accordance wtih the present invention is now described in reference to FIG. 1. The watercraft 10 is capable of operating as a conventional displacement vessel. In this operating mode water is drawn in through the drogue 18 and output through appropriate horizontally directed nozzles, such as 84-90, to provide horizontal movement and control. In this mode the nozzles 64-70 are not used. By use of the fore, aft and transverse thruster nozzles, the watercraft 10 can be carefully and precisely maneuvered in restricted areas, such as ports and rocky inlets.

In the second operating mode, water is drawn up through the drogue 18, pressurized by the pump 42 and directed downward through the nozzles 64-70. The water is accelerated through the nozzles to produce a reaction force on the nozzles which in turn serves to lift the hull 12 out of the body of water 16. In the horizontal plane, the watercraft 10 is directed and maneuvered by operation of the transverse thruster nozzles such as 84-90. Forward motion, for example, is produced by directing water through the aft nozzle 84.

The control computer 100 monitors the altimeters 94 and 96 to control the reaction thrust produced by the downward facing nozzles to maintain the hull 12 in a stable orientation with a constant altitude. The required altitude is essentially a function of the wave height. This is modified by operation of the radar 92. The required headings and directional control are input by an operator through the control computer 100. The position of the drogue 18 is controlled by the computer 100 by directing commands through the bus 102 to the hydraulic drive 40 which in turn positions the hydraulic actuator 32. The drogue 18 is thereby positioned to maintain the ports 20 below the minimum water level. If a large wave ahead is detected by the radar 92 or by the altimeter 94, the computer 100 compensates to raise the watercraft 10 and lower the drogue 18 to prevent drawing air up through the drogue 18.

Differential lift applied through the port/starboard lift nozzles, such as 64-70, can cause the craft 10 to bank.

The water tank 52 is filled with a supply of water which is received from the first water distribution system 48 and valve 54. If for some reason the ports 20 do break the surface of the water and air is drawn into the drogue 18, the control computer 100 switches the multi-function valve 26 to supply water to the pump 42 from the tank 52. This serves to maintain the stability of the watercraft 10 even in especially turbulent water conditions. It also permits the watercraft 10 to continue for short distances in the air beyond the water line to reach a beach or port landing area.

When the watercraft 10 is operating over a sandy beach or a prepared landing surface, it may be desirable to inject air into the water stream from the lift nozzles, such as 64-70, to reduce the impact of the water jets on the underlying terrain.

The lift nozzles, again such as 64-70, are preferably mounted at a relatively high position on the hull 12 such that the reaction lift force is applied above the center of gravity of the watercraft 10. This serves to enhance the basic stability of the watercraft 10.

An optional embodiment for the present invention comprises utilizing a plurality of nozzles which are gimbled such that the same nozzle can be used for producing lift and maneuvering thrust.

Several optional configurations for the drogue unit 18 are illustrated in FIGS. 2, 3 and 4. In FIG. 2 there is included a motor-pump unit 106 which is connected to the drogue 18. Control and power is supplied to the motor-pump unit 106 through a cable 108. The motor within unit 106 is preferably hydraulic or electric. The pump in unit 106 draws water in through ports 20 and drives it up through drogue 18. The unit 106 can be used to either supplement the pump 42 or totally replace it. The transfer of the pump can serve to reduce the weight of the watercraft 10. It can also be used when it is desired to have the drogue 18 be extremely long to permit the watercraft 10 to extend past a water's edge to a relatively long distance or to clear a high object. Atmospheric pressure limits suction practically to approximately 15 feet but unit 106 eliminates this restriction.

Referring now to FIG. 3 there is shown a drogue 18 together with the intake ports 20. There is further included a vane 114 which is mounted on the lower end of the drogue 18 and serves to hold the drogue under the surface of the water 16. The vane 114 helps to prevent the ports 20 from broaching the surface of the water 16.

Referring now to FIG. 4 there is shown a flexible drogue 116 which is used in place of the drogue 18 described above. Drogue 116 is connected to the hull 12 and multi-function valve 26 as described above for the drogue 18. The vane 114 is mounted at the lower end of the drogue 116. The drogue 116 can be stored within the hull 12 and payed-out as necessary to aid the positioning of the watercraft 10. Its preferred use would be to enable the watercraft 10 to cross a beach and reach a desired landing spot. In a further configuration the motor-pump unit 106 can also be attached to the drogue 116 to add further water pumping capability thereby enhancing the range of the watercraft 10 beyond the edge of the water 16.

In summary the present invention comprises a watercraft having a water jet lift and propulsion system which permits the craft to fly above the water thereby eliminating friction with the water, permitting the craft to maneuver in shallow water, pass over rocky obstacles and land beyond the shore's edge at a landing site.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention.

I claim:

1. The watercraft, comprising:
   a hull;
   a motor mounted to said hull;
   a water pump driven by said motor;
   a multi-function valve mounted at the inlet to said pump;
   a drogue having a first end thereof connected to said multi-function valve and a second end thereof including a port for extending into a body of water below said hull for transporting water from said body of water to said multi-function valve by operation of said pump;
   an actuator connected between said hull and said drogue for positioning said drogue;
   a water distribution means connected to receive pressurized water from the outlet of said pump;
   a water tank mounted on said hull and connected to receive water from said water distribution means and supply water to said multi-function valve;
   a first array of downwardly directed nozzles connected to receive pressurized water from said water distribution means for producing water jets which causes reaction forces to lift said watercraft above said body of water;
   a second array of laterally directed nozzles connected to receive pressurized water from said water distribution means for producing water jets which causes reaction forces for orienting said watercraft and for propelling said watercraft across said body of water; and
   valves connected to receive pressurized water from said water distributiion means for controlling the water flow to a group of said nozzles; and
   control means connected to control the operation of said motor, said valves, and said actuator.

2. A watercraft comprising:
   a hull;
   a power source mounted to said hull;
   a water pump driven by said power source;
   a drogue for extending below said hull for transferring water from a body of water below said hull to said pump by the action of said pump;
   a plurality of nozzles mounted to said hull and connected to receive pressurized water from said pump for producing downwardly directed water jets which produce reaction forces to lift said hull above said body of water; and
   a water storage tank connected to said pump for receiving water from said pump and supplying stored water to said pump.

3. A watercraft as recited in claim 2 including an actuator connected to said hull and said drogue for positioning said drogue.

4. A watercraft as recited in claim 2 including a longitudinal recess in the bottom of said hull for receiving said drogue.

5. A watercraft as recited in claim 2 wherein said drogue is a substantially rigid tubular member pivotally mounted to said hull.

6. A watercraft as recited in claim 2 wherein said drogue is a flexible tubular member supported by said hull at one end thereof.

7. A watercraft as recited in claim 2 including a vane is mounted on said drogue near the end thereof opposite said hull.

8. A watercraft as recited in claim 2 including a control system for directing the operation of said power source and said nozzles.

9. A watercraft as recited in claim 2 including a plurality of second nozzles connected to receive pressurized water from said pump for producing laterally directed water jets which cause reaction forces to move said watercraft in any lateral or orientation manner.

10. A watercraft comprising:
    a hull;
    a power source mounted to said hull;
    a water pump driven by said power source;
    a drogue for extending below said hull for transferring water from a body of water below said hull to said pump by the action of said pump;
    a plurality of nozzles mounted to said hull and connected to receive pressurized water from said pump for producing downwardly directed water jets which produce reaction forces to lift said hull above said body of water;
    a control system for directing the operation of said power source and said nozzles; and
    means mounted on said hull for detecting wave height and generating a control signal for input to said control system.

11. A watercraft, comprising
    a hull;
    a power source;
    a drogue supported by said hull, said drogue for transmitting water therethrough from a body of water below said hull;
    a pump mounted on said drogue and driven by said power source, said pump for driving said water through said drogue;
    a plurality of nozzles mounted to said hull and connected to receive pressurized water from said pump through said drogue for producing downwardly directed water jets to cause reaction forces for lifting said hull above said body of water;

a control system for directing the operation of said power source and said nozzles; and means mounted on said hull for detecting wave height in a projected path of said watercraft and generating a control signal for input to said control system.

12. A watercraft comprising:
a hull;
a power source;
a drogue supported by said hull, said drogue for transmitting water therethrough from a body of water below said hull;
a pump mounted on said drogue and driven by said power source, said pump for driving said water through said drogue;
a plurality of nozzles mounted to said hull and connected to receive pressurized water from said pump through said drogue for producing downwardly directed water jets to cause reaction forces for lifting said hull above said body of water; and
a tank for storing water received from said drogue.

13. A watercraft as recited in claim 12 including an actuator connected to said hull and said drogue for positioning said drogue.

14. A watercraft as recited in claim 12 including a recess in the bottom of said hull for receiving said drogue.

15. A watercraft as recited in claim 12 wherein said drogue is a substantially rigid tubular member pivotally mounted to said hull.

16. A watercraft as recited in claim 12 wherein said drogue is a flexible tubular member supported by said hull at one end thereof.

17. A watercraft as recited in claim 12 including a vane mounted on said drogue to the end thereof opposite said hull.

18. A watercraft as recited in claim 12 including a control system for directing the operation of said power source and said nozzles.

19. A watercraft as recited in claim 12 including a plurality of second nozzles connected to receive pressurized water from said drogue for producing laterally directed water jets which cause reaction forces to move said watercraft in any lateral or orientation manner.

20. A watercraft comprising:
a hull;
a power source;
a drogue supported by said hull, said drogue for transmitting water therethrough from a body of water below said hull;
a pump mounted on said drogue and driven by said power source, said pump for driving said water through said drogue;
a plurality of nozzles mounted to said hull and connected to receive pressurized water from said pump through said drogue for producing downwardly directed water jets to cause reaction forces for lifting said hull above said body of water;
a control system for directing the operation of said power source and said nozzles; and
means mounted on said hull for detecting wave height and generating a control signal for input to said control system.

21. A watercraft, comprising:
a hull;
a motor mounted to said hull;
a water pump driven by said motor;
a multi-function valve mounted at the inlet to said pump;
a drogue having a first end thereof connected to said multi-function valve and a second end thereof including a port for extending into a body of water below said hull for transporting water from said body of water to said multi-function valve by operation of said pump;
an actuator connected between said hull and said drogue for positioning said drogue;
a water distribution means connected to receive pressurized water from the outlet of said pump;
a water tank mounted on said hull and connected to receive water from said water distribution means and supply water to said multi-function valve;
a first array of downwardly directed nozzles connected to receive pressurized water from said water distribution means for producing water jets which cause reaction forces to lift said watercraft above said body of water;
a second array of horizontally directed nozzles connected to receive pressurized water from said water distribution means for producing water jets which cause reaction forces for propelling said watercraft across said body of water; and
control means connected to control the operation of said motor, said multi-function valve and said actuator.

22. A watercraft, comprising:
a hull;
a power source mounted to said hull;
a water pump driven by said power source;
a drogue for extending below said hull for transferring water from a body of water below said hull to said pump by the action of said pump;
a plurality of nozzles mounted to said hull and connected to receive pressurized water from said pump for producing downwardly directed water jets which produce reaction forces to lift said hull above said body of water;
means for individually controlling the flow of water through selected ones of said nozzles for controlling the attitude of said watercraft above said body of water; and
a water storage tank connected to said pump for receiving water from said pump and supplying stored water to said pump.

23. A watercraft, comprising:
a hull;
a power source mounted to said hull;
a water pump driven by said power source;
a drogue for extending below said hull for transferring water from a body of water below said hull to said pump by the action of said pump;
a plurality of nozzles mounted to said hull and connected to receive pressurized water from said pump for producing downwardly directed water jets which produce reaction forces to lift said hull above said body of water;
means for individually controlling the flow of water through selected ones of said nozzles for controlling the attitude of said watercraft above said body of water;
a control system for directing the operation of said power source and said nozzles; and
means mounted on said hull for detecting wave heights in a projected path of said watercraft and generating a control signal for input to said control system.

24. A watercraft, comprising:

a hull;

a power source;

a drogue supported by said hull, said drogue for transmitting water therethrough from a body of water below said hull;

a pump mounted on said drogue and drive by said power source, said pump for driving said water through said drogue;

a plurality of nozzles mounted to said hull and connected to receive pressurized water from said pump through said drogue for producing downwardly directed water jets to cause reaction forces for lifting said hull above said body of water; and a tank for storing water received from said drogue.

* * * * *